Figure 1:
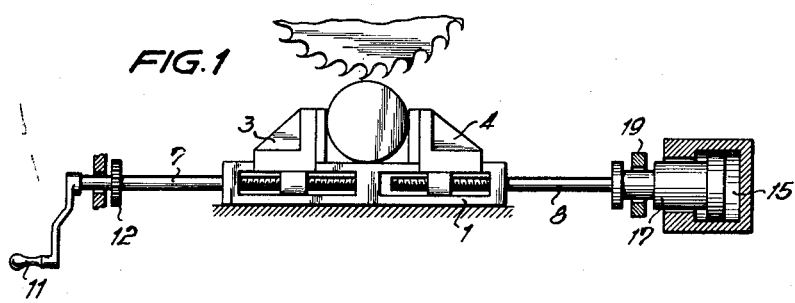

Nov. 6, 1956 R. HAKE 2,769,224
SAWING MACHINE
Filed March 2, 1954

INVENTOR
Richard Hake
By Ernest F. Montague
Attorney

United States Patent Office 2,769,224
Patented Nov. 6, 1956

2,769,224

SAWING MACHINE

Richard Hake, Remscheid-Vieringhausen, Germany, assignor to Joh. Friedrich Ohler O. H. G., Remscheid-Vieringhausen, Germany, a corporation of Germany Application March 2, 1954, Serial No. 413,683

Claims priority, application Germany March 11, 1953

2 Claims. (Cl. 29—67)

The present invention relates to hydraulic clamping means for cold operating sawing machines and in particular to such machines which have a double screw-vise disposed on both sides of the median plane of the circular saw blade and in which the clamping member is adjustable individually or jointly. The movable clamping members are adjusted by operating means comprising a pressure cylinder, a piston and a piston rod.

It is one object of the present invention to provide a screw-vise for sawing machines which permits the transfer of the pressure required for clamping the work-pieces selectively over one or more adjustable clamping members to the work-piece in such manner that the clamping pressure remains constant independently of the number of clamping members used and to apply such pressure to a single clamping member if one clamping member is used only.

In known structures of this type, the pressure on the work-piece was always in direct relation to the number of used clamping members and increased in accordance with the number of used clamping members. Such increase in pressure on the work-piece is, however, not desirable in many instances, particularly in cases where thin-walled, work-pieces, which are easily deformed, were used.

In addition, the measurements of the clamping device, particularly of the hydraulic cylinder and the like were necessarily large, in order to provide sufficient large pressure for each individual screw-vise, to assure satisfactory clamping of the work-piece. This in turn had the drawback that the clamping device required comparatively a very large space.

It is, therefore, another object of the present invention to provide a clamping device in which the piston of one of the pressure cylinders is movably connected with the piston of the other of the pressure cylinders by means of a connector and in particular in such manner, that the full pressure of both cylinders may be applied to one screw-vise.

It is yet another object of the present invention to provide a clamping device, in which both screw-vises may be used selectively jointly or individually for the clamping of the work-pieces, whereby the sum of both clamping pressures applied to the work-piece corresponds always with the required total pressure.

It is also a further object of the present invention to provide a clamping device in which the piston of one of the pressure cylinders is movably connected with the piston of the other of the pressure cylinders by means of a connector which is secured to the end face of the first mentioned piston and which encloses with axial play a circular groove of the said other piston, so that one or the other side face of said groove operates as abutment and coupling means for the connector.

Figure 2:
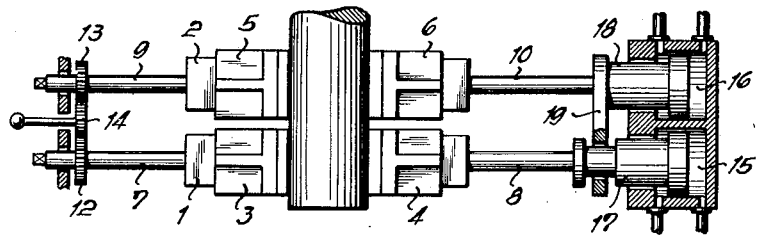
Figure 3:
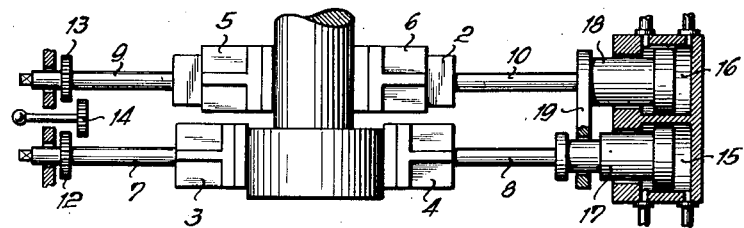
Figure 4:
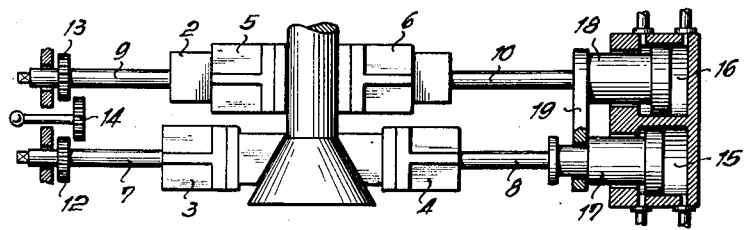

With these and other objects in view which will become apparent in the following detailed description, the present invention will be clearly understood in connection with the accompanying drawing, in which:

Figure 1 is an elevational fragmentary view of a cold operating sawing machine; and Figs. 2 to 4 are plan views of a double screw-vise with hydraulic operating means applied to differently shaped work-pieces.

Referring now to the drawing, the two screw-vises comprise a frame 1 and 2, respectively, which are connected with the base. The frames 1 and 2 carry the clamping members 3, 4 and 5, 6, respectively, by means of the shafts 7, 8 and 9, 10, respectively, which shafts carry right and left threads. The adjustment of the clamping members to a special cross-section of the work-piece is brought about by a hand operated crank 11, whereby the work-piece is simultaneously centered.

The shafts 7 and 9 of the two screw-vises are coupled together by means of the gears 12, 13 and an adjustable intermediate gear 14, so that the adjustment of the clamping members may be achieved selectively jointly or also individually independently from each other by any conventional means. A pressure cylinder 15 and 16 serves the purpose of clamping and releasing, respectively, the work-piece and the pistons 17 and 18 of the respective cylinders 15 and 16 are rotatably connected with the shafts 8 and 10, respectively.

The pressure cylinders 15 and 16 are connected with pressure feed lines and may be adjusted by means of conventional control means (not shown) selectively either jointly or individually. The clamping pressure exerted upon the work-piece is equal to the sum of the individual clamping pressures. $P = P_1 + P_2$.

In case of equal cross-section of the cylinders and equal pressure prevailing therein, the clamping pressure may be equally divided at both clamping points. It is also possible, however, to provide different cross-sections for the respective cylinders or to provide different pressures therein whereby selectively different clamping pressures may be applied to the respective clamping points. A pressure change in one cylinder has no effect on the pressure in the other cylinder.

The stroke of the pistons 17 and 18 is sufficient to compensate for differences in the cross-section of the work-piece, however, the two screw-vise halves may be adjusted individually upon release or axial movement of the coupling-gear 14, so that for instance work-pieces with projections or flanges may be clamped on both sides of the saw blade with full pressure.

In accordance with the present invention the safety of the desired clamping pressure is increased by connecting the two pistons 17 and 18 by means of a connector 19. The latter is for instance rigidly secured to the end face of the piston 18, while it encloses the other piston 17 in a ring-shaped groove. The width of the latter is greater than the width of the connector 19.

The present device functions in the following manner:

If differences in the cross-sections of rods are experienced which rods are to be subjected to a sawing operation, which differences are greater than the stroke of one of the two pistons 17 and 18, so that one only reaches the clamping position, then the other piston transfers its pressure to the first piston and, thereby to the first clamping member by means of the connector 19. In this manner it is assured that the work-piece is always clamped with full pressure of both pressure cylinders, though on one side only, in accordance with $P = P_1 + P_2$, P being the combined pressure, $P_1$ being the pressure of one cylinder and $P_2$ being the pressure of the other cylinder.

It is also thus possible to use one of the two screw-vises only for bringing about the clamping of the work-piece. In order to achieve this end, the coupling gear 14 between the two gears 12 and 13 is released. Then one of the screw-vises is adjusted to the cross-section of the work-piece, while the other is opened so much that its clamping members remain out of engagement with the work-piece. The clamping effect will then be the same as described above.

It is also possible, however, to clamp irregularly shaped work-pieces with full clamping pressure, as demonstrated in Figs. 3 and 4 of the drawing.

While I have disclosed several embodiments of the present invention, it is to be understood that these embodiments are given by example only and not in a limiting sense, the scope of the present invention being determined by the objects and the claims.

I claim:

1. A hydraulic control system comprising a base, a pair of hydraulic vise means positioned on said base in parallel arrangement, each of said vise means including a pair of opposed jaws, right and left hand screw means supporting said opposed jaws of each of said vise means, means for operating selectively one or both said vise means, said operating means for each of said vise means including a hydraulic cylinder, a piston reciprocating in said cylinder and a piston rod connected with the corresponding of said vise means, and means for connecting said piston of one of said cylinders with that of the other of said cylinders, thereby exerting the pressure of both said pistons on one of said vise means.

2. The hydraulic control system, as set forth in claim 1, in which said means for connecting said pistons comprises a connector secured to the outer end face of one of said pistons, and the other of said pistons has a ring-shaped groove of a width greater than that of said connector, and the latter enclosing with axial play the other of said pistons in said ring-shaped groove, so that upon engagement of said connector with either one of the end faces of said ring-shaped groove, the other of said pistons is coupled for joint movement with the one of said pistons in the respective directions of movement of said pistons.

References Cited in the file of this patent

UNITED STATES PATENTS

| | | |
|---|---|---|
| 1,840,684 | Welch | Jan. 12, 1932 |
| 2,365,987 | Zimmerman | Dec. 26, 1944 |
| 2,368,138 | Hayden | Jan. 30, 1945 |
| 2,491,901 | Moohl et al. | Dec. 20, 1949 |
| 2,511,563 | Bullard | June 13, 1950 |
| 2,598,233 | Deardorff | May 27, 1952 |